US012450007B2

(12) United States Patent
Liu

(10) Patent No.: US 12,450,007 B2
(45) Date of Patent: Oct. 21, 2025

(54) DEBUG INTERFACE BETWEEN A HOST SYSTEM AND A MEMORY SYSTEM

(71) Applicant: Micron Technology, Inc., Boise, ID (US)

(72) Inventor: Haihong Liu, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/420,174

(22) PCT Filed: May 6, 2021

(86) PCT No.: PCT/CN2021/091866
§ 371 (c)(1),
(2) Date: Jul. 1, 2021

(87) PCT Pub. No.: WO2022/232980
PCT Pub. Date: Nov. 10, 2022

(65) Prior Publication Data
US 2024/0061611 A1    Feb. 22, 2024

(51) Int. Cl.
*G06F 3/06* (2006.01)
(52) U.S. Cl.
CPC .......... *G06F 3/0659* (2013.01); *G06F 3/0619* (2013.01); *G06F 3/0658* (2013.01); *G06F 3/0671* (2013.01)
(58) Field of Classification Search
None
See application file for complete search history.

(56) References Cited

U.S. PATENT DOCUMENTS

| 5,548,750 A * | 8/1996 | Larsson ............... G06F 11/1464 |
| 2010/0205377 A1* | 8/2010 | Moyer ................ G06F 12/0831 |
| | | 711/146 |

(Continued)

FOREIGN PATENT DOCUMENTS

| CN | 104283705 A | 1/2015 |
| CN | 109032897 A | 12/2018 |

OTHER PUBLICATIONS

"International Search Report and Written Opinion of the International Searching Authority," issued in connection with Int'l Appl. No. PCT/CN2021/091866, dated Jan. 28, 2022 (9 pages).

*Primary Examiner* — Stephanie Wu
(74) *Attorney, Agent, or Firm* — Holland & Hart LLP

(57) ABSTRACT

Methods, systems, and devices for a debug interface between a host system and a memory system are described. The memory system may receive, from the host system, a first command triggering debug logging at the memory system. In response to the first command, the memory system may store debugging information in a debug log for a specific set of commands. For example, the debugging information stored by the memory system may be associated with one or more parameters indicated by the first command. The memory system may receive a second command, from the host system, requesting a portion of information from the debug log. The portion of information may include performance data, error information, or the like stored in the debug log (e.g., in response to the first command). The memory system may send the requested portion of information to the host system in response to the second command.

19 Claims, 9 Drawing Sheets

(56) References Cited

U.S. PATENT DOCUMENTS

| | | | |
|---|---|---|---|
| 2012/0216079 A1* | 8/2012 | Fai | G06F 11/362 |
| | | | 714/E11.055 |
| 2016/0103752 A1* | 4/2016 | Bates | G06F 11/3632 |
| | | | 717/124 |
| 2016/0162375 A1* | 6/2016 | Kim | G06F 3/0673 |
| | | | 714/6.13 |
| 2016/0378582 A1* | 12/2016 | Choi | G06F 11/0727 |
| | | | 714/37 |
| 2018/0267737 A1* | 9/2018 | Oe | G06F 3/061 |
| 2019/0332519 A1* | 10/2019 | Myers | G06F 11/3093 |
| 2022/0019499 A1* | 1/2022 | Choi | G06F 11/0787 |
| 2022/0083442 A1* | 3/2022 | Hanham | G06F 11/3476 |

* cited by examiner

DEBUG INTERFACE BETWEEN A HOST SYSTEM AND A MEMORY SYSTEM

CROSS REFERENCE

The present Application for Patent is a 371 national phase filing of International Patent Application No. PCT/CN2021/091866 by LIU et al., entitled "DEBUG INTERFACE BETWEEN A HOST SYSTEM AND A MEMORY SYSTEM," filed May 6, 2021, assigned to the assignee hereof, and expressly incorporated by reference herein.

FIELD OF TECHNOLOGY

The following relates generally to one or more systems for memory and more specifically to a debug interface between a host system and a memory system.

BACKGROUND

Memory devices are widely used to store information in various electronic devices such as computers, user devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not- or (NOR) and not- and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
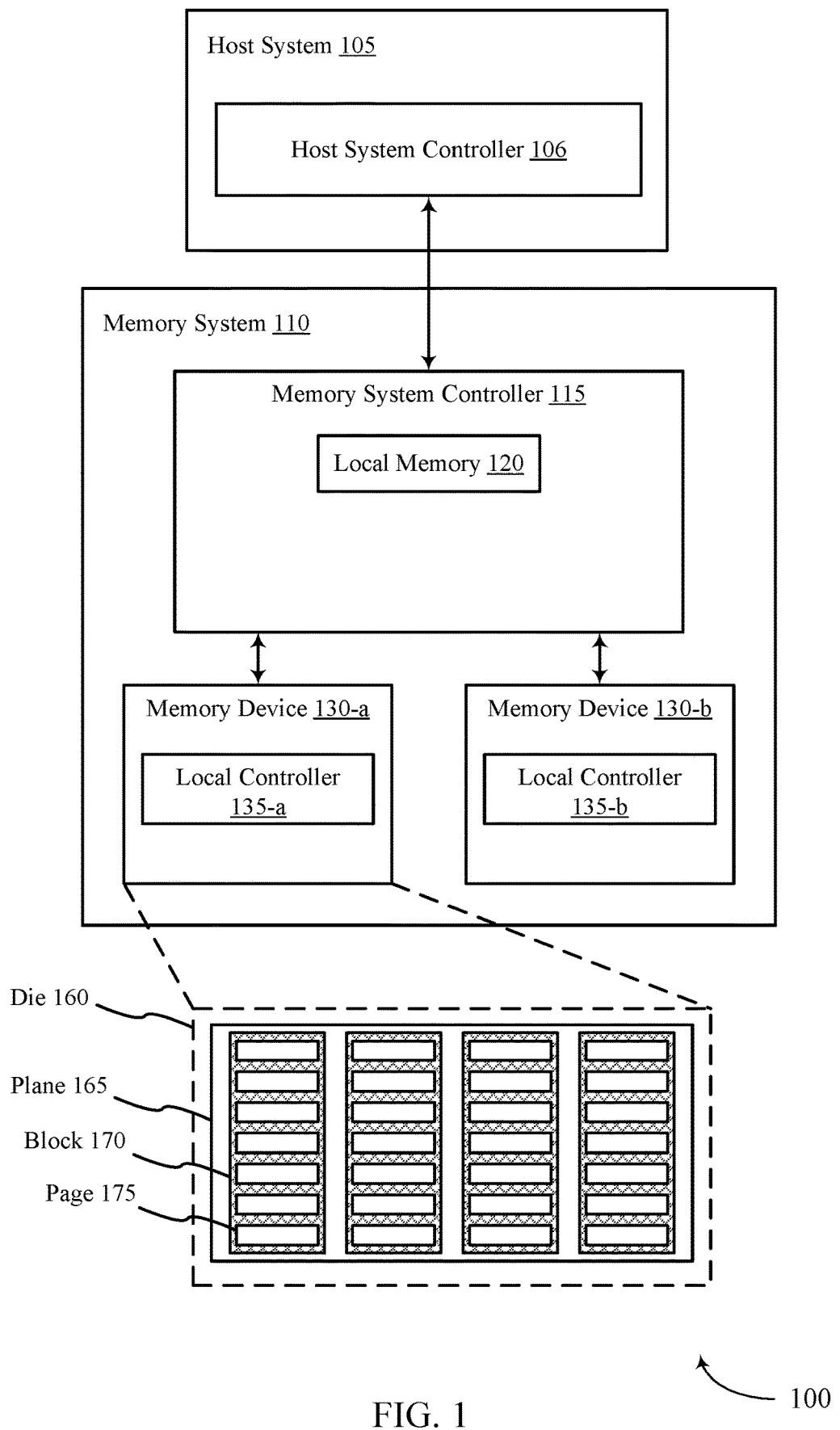
FIGS. 1 through 4 illustrate examples of systems that support a debug interface between a host system and a memory system in accordance with examples as disclosed herein.

A host system may transmit, to a memory system, commands associated with performing one or more access operations on a memory device, such as read operations, write operations, or other operations. In some examples, performing an access operation on the memory device may cause performance issues. For example, performing a read operation may involve significant latency (e.g., greater than a threshold latency), in some cases, resulting in a read failure. In some other examples, performing an access operation on the memory device may result in one or more errors. For example, performing a write operation on a memory device may be unsuccessful or performing a read operation on a memory device may return incorrect data, resulting in a failure. However, the host system may not receive information associated with such errors, thereby making the cause of such errors challenging to determine. In some cases, debugging performance issues, errors, or both may involve direct rigorous testing of the memory system. For example, debugging performance issues may include testing memory blocks of the memory system one by one to locate the root cause of an error. As such, due to the complexity and density of memory systems, debugging performance issues may use a significant amount of resources and may take a significant amount of time.

Systems, devices, and techniques are described to provide for the host system to flexibly trigger the logging and retrieval of debugging information using one or more commands. In some examples, the host system may transmit a first command to the memory system. The first command may trigger the memory system to log specific debugging information in a debug log. In some examples, the first command may indicate an operating mode (e.g., a debug mode) and may include one or more parameters associated with the operating mode. The host system may flexibly select parameters to indicate, to the memory system, which information to store in the debug log and which information to filter out from debug logging. In some examples, the memory system may perform access operations and, in response to receiving the first command, may store performance data associated with the parameters within the debug log. In some examples, the host system may transmit a second command to the memory system. The second command may be associated with the first command. For example, the second command may indicate the debug mode and may include one or more parameters for retrieving debugging information. The host system may flexibly select parameters to indicate, to the memory system, the specific information to retrieve from the debug log. Upon receiving the second command, the memory system may retrieve, from the debug log, performance data and error information associated with the parameters indicated by the second command. The memory system may transmit, and the host system may receive, the debugging information, allowing the host system to retrieve logged data indicating performance issues, error information, or both. Providing such an interface for the host system to trigger debug logging and retrieve information from a debug log may provide for a more robust debug mode, thereby improving debugging performance and enhancing diagnostic accuracy.

Features of the disclosure are initially described in the context of systems, devices, and circuits with reference to FIGS. 1 through 4. Features of the disclosure are described in the context of a flow diagram with reference to FIG. 5. These and other features of the disclosure are further illustrated by and described in the context of an apparatus diagram and flowchart that relate to a debug interface between a host system and a memory system with reference to FIGS. 6 through 9.

FIG. 1 illustrates an example of a system 100 that supports a debug interface between a host system 105 and a memory system 110 in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMIVIC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

The system 100 may include any quantity of non-transitory computer readable media that support debug interface between a host system and a memory system. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some cases, a host system 105 may transmit commands to a memory system 110 associated with performing one or more access operations on a memory device 130. In some cases, performing an access operation on the memory device 130 may cause performance issues. For example, performing a read operation may involve significant latency (e.g., greater than a threshold latency) at one or more components of the memory system 110, a memory device 130, or both. In some other cases, performing an access operation on the memory device 130 may result in one or more errors. For example, performing a write operation on a memory device 130 may be unsuccessful, resulting in a write failure. Additionally or alternatively, performing a read operation on a memory device 130 may return inaccurate or incomplete data, resulting in a read failure. However, the host system 105 may not receive information indicating a source or data associated with such performance issues, errors, or both, thereby making the cause of such errors challenging to determine.

Systems, devices, and techniques are described to provide for the host system 105 to flexibly trigger the logging and retrieval of debugging information using one or more commands. In some examples, the host system 105 may transmit a first command to the memory system 110. The first command may trigger the memory system 110 to log specific debugging information in a debug log. In some examples, the first command may indicate an operating mode (e.g., a debug mode) and may include one or more parameters associated with the operating mode. The host system 105 may select parameters to indicate, to the memory system 110, which information to store in the debug log and which information to filter out from debug logging. In some examples, the memory system 110 may perform access operations and, in response to receiving the first command, may store within the debug log performance data, error information, or both associated with the indicated parameters.

In some examples, the host system 105 may transmit a second command to the memory system. The second command may be associated with the first command. For example, the second command may indicate the debug mode and may include one or more parameters for retrieving debugging information. The host system 105 may select parameters to indicate, to the memory system 110, the specific information to retrieve from the debug log. Upon receiving the second command, the memory system 110 may retrieve, from the debug log, performance data and error information associated with the parameters indicated by the second command. The memory system 110 may transmit, and the host system 105 may receive, the debugging information, allowing the host system 105 to retrieve logged data indicating performance issues, error information, or both. Providing an interface for the host system 105 to trigger logging and retrieval of information from a debug log may provide for a more robust debug mode (e.g., a host system-controlled debug mode), thereby improving debugging performance and enhancing diagnostic accuracy.

Figure 2:
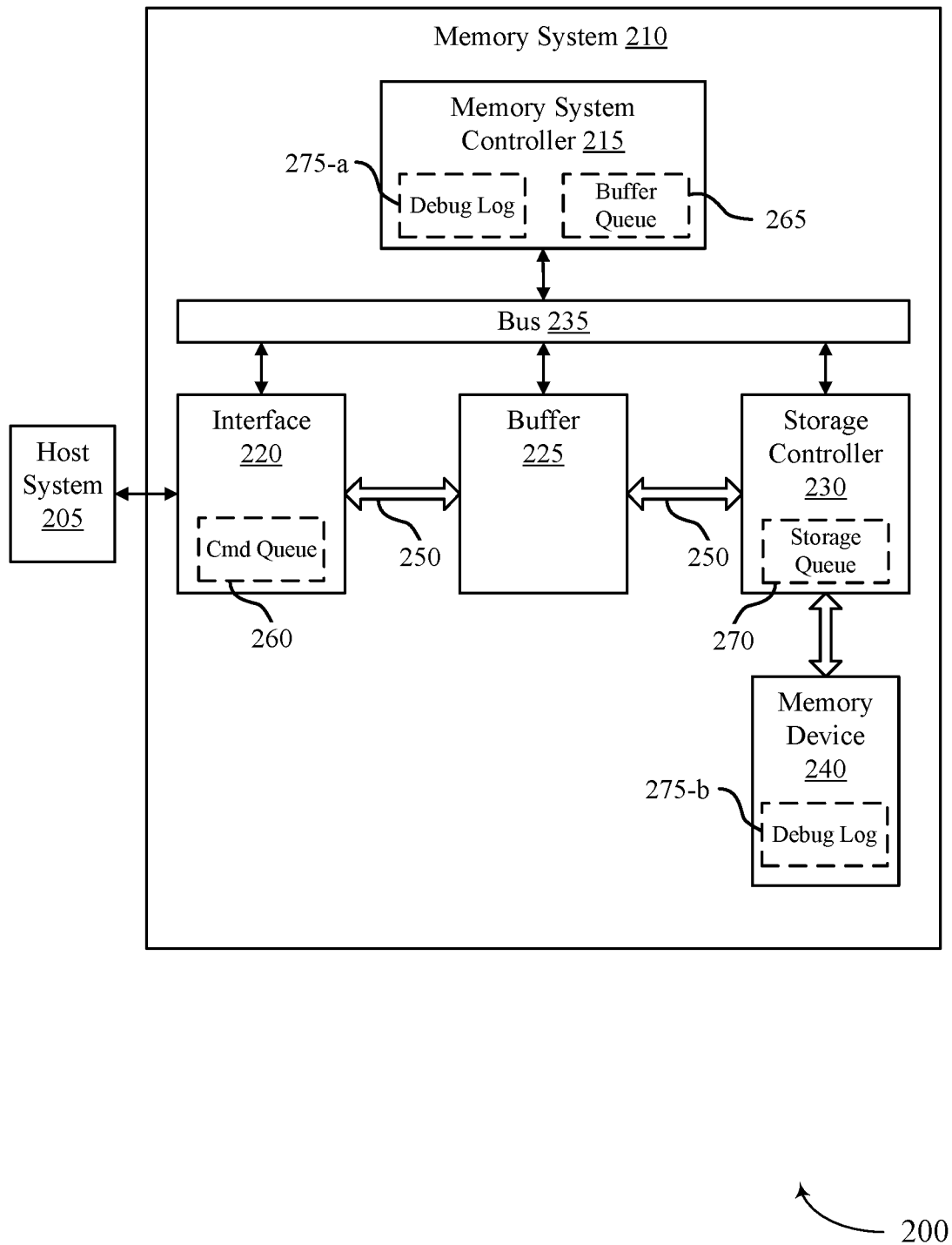

FIG. 2 illustrates an example of a system 200 that supports a debug interface between a host system 205 and a memory system 210 in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMNIC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received before, during, or after communicating with the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMNIC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, in response to the data transfer to the buffer 225 being completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMNIC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

In some cases, performing an access operation on the memory device 240 may cause performance issues, result in one or more errors, or both. The performance issues, errors, or both may occur at one or more components of the memory system 210, the memory device 240, or a combination thereof. If the host system 205 does not receive information indicating the sources or causes of such performance issues, errors, or both, the host system 205 may fail to support debugging operations. For example, the host system 205 may fail to provide valuable debugging information to another device or system, such that the other device or system may not be able to fix or improve the performance issues, errors, or both experienced by the memory system 210.

In some examples, the system 200 may support a debug interface such that the host system 205 may trigger the logging and retrieval of valuable debugging information using one or more debug logs 275. For example, the host system 205 may transmit a first command triggering the logging of debugging information associated with one or more actions (e.g., access operations) at the memory system 210. In some examples, the first command may include an indication of a debug mode and an indication of one or more parameters associated with the debug mode. The host system 205 may flexibly select parameters to indicate, to the memory system 210, what information to store in the debug log 275 and what information to filter out from debug logging. In some examples, the memory system 210 may perform access operations and, in response to receiving the first command, the memory system 210 may store debugging information associated with the parameters indicated in the first command within a debug log 275. In some cases, a debug log 275-a (e.g., a runtime debug log 275-a) may be stored at a cache, such as a local cache (e.g., the SRAM) of the memory system controller 215. In some other cases, a debug log 275-b (e.g., a historical debug log 275-b) may be stored at one or more memory devices 240. The memory system 210 may initially store debug logging information in the debug log 275-a (e.g., as a command is executed and debugging information is stored for the command). The debug logging information may be transferred to persistent storage (e.g., from the debug log 275-a to the debug log 275-b) to increase available memory resources at the debug log 275-a, persist the debug logging information if the memory system 210 powers down, or both.

In some examples, the memory system 210 may log debugging information associated with one or more layers (e.g., logical layers, interfaces) of the memory system 210. For example, the memory system 210 may log performance data for a front end layer (e.g., the interface 220), for a management layer (e.g., the memory system controller 215), for a back end layer (e.g., the storage controller 230), or for any combination of these or other layers of the memory system 210. The host system 205 may transmit a second command to the memory system 210 to retrieve at least a portion of the debugging information stored in a debug log 275. The second command may indicate the debug mode and may indicate parameters for retrieving debugging information. Upon receipt of the second command, the memory system 210 may retrieve, from the debug log 275, debugging information associated with the parameters indicated by the second command. In some examples, debugging information may be retrieved from a runtime debug log 275-a, a historical debug log 275-b, or both. The memory system 210 may transmit the debugging information to the host system 205, allowing the host system 205 to identify performance issues and error information included in the debugging information. Providing such an interface for the host system 205 to trigger the logging and retrieval of debugging information using a debug log 275 may provide for a more robust debug mode, thereby improving debugging performance and enhancing diagnostic accuracy for the memory system 210.

Figure 3:
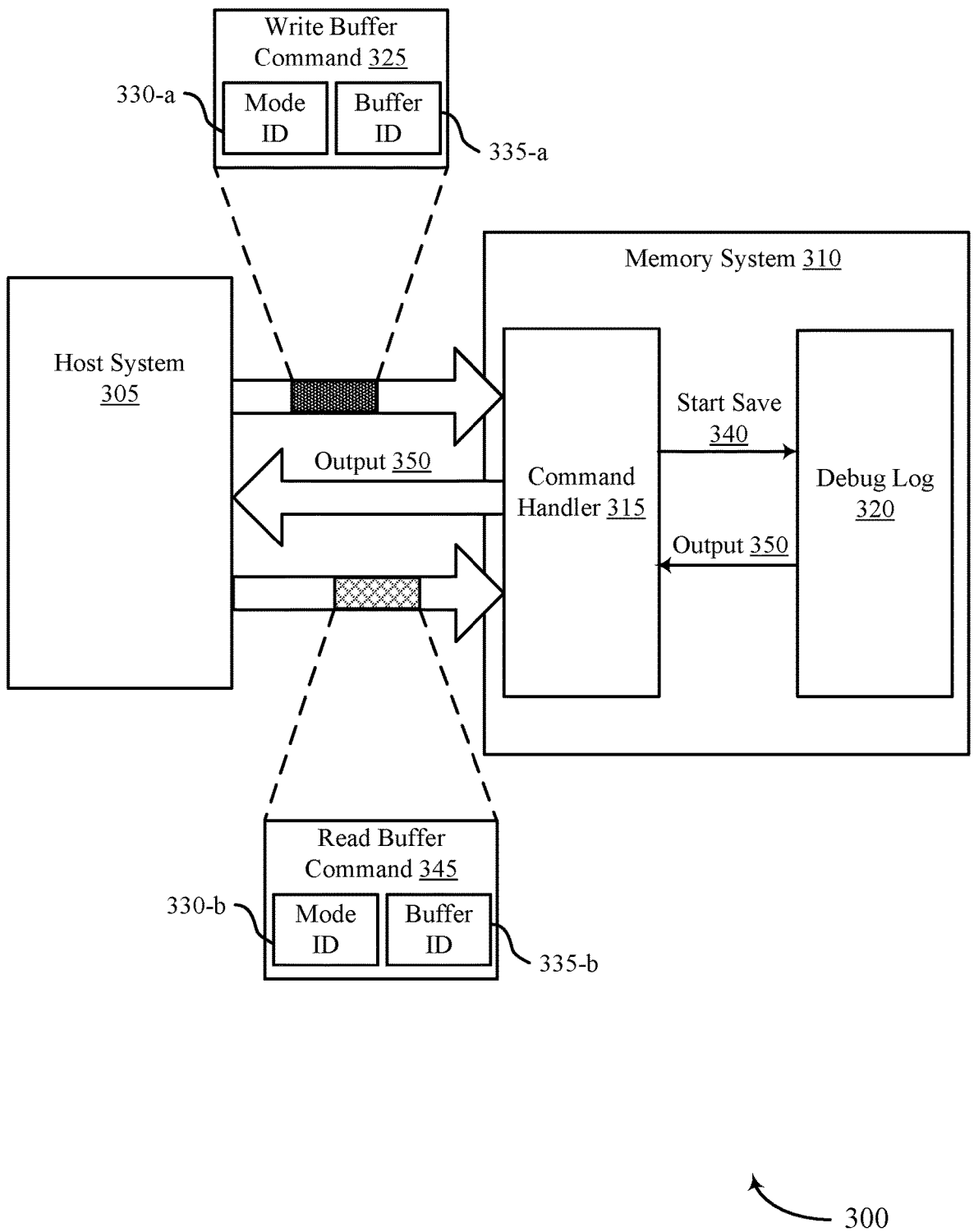

FIG. 3 illustrates an example of a system 300 that supports a debug interface between a host system 305 and a memory system 310 in accordance with examples as disclosed herein. The system 300 may be an example of a system 100 or a system 200 as described with reference to FIGS. 1 and 2. The system 300 may include a memory system 310 configured to store data received from the host system 305 and to send data to the host system 305, if requested by the host system 305 using access commands (e.g., write commands and read commands, respectively). The system 300 may support an interface for the host system 305 to specify parameters for debugging at the memory system 310 and to retrieve specific debugging information from the memory system 310. In some examples, the interface may define one or more UFS protocol interface unit (UPIU) commands to configure the debug logging at the memory system 310, request access to data stored in a debug log 320, or both. As such, the debug interface (e.g., using UPIU commands) may support flexible debug logging and retrieval configured by the host system 305.

The memory system 310 may include a command handler 315 which may function as an interface between the host system 305 and memory system 310. The command handler 315 may be an example of one or a combination of exemplary devices as described with reference to FIG. 2. For example, the command handler 315 may be an example of an interface 220, a memory system controller 215, a storage controller 230, or a combination thereof. The memory system 310 may include a debug log 320 which may be an example of one or more debug logs 275 as described with reference to FIG. 2.

In some examples, the host system 305 may transmit a write buffer command 325 to the memory system 310. The host system 305 may indicate the write buffer command 325 using, or may associate the write buffer command 325 with, one or more UPIUs. The host system 305 may send the write buffer command 325 to the memory system 310 using a UPIU command interface. The write buffer command 325 may include a mode identifier (ID) value 330-a, a buffer ID value 335-a, or both. For example, the host system 305 may include the mode ID value 330-a in a mode ID field and the buffer ID value 335-a in a buffer ID field of the write buffer command 325. In some examples, the mode ID value 330-a may indicate an operating mode amongst one or more predefined operating modes. That is, the mode ID value 330-a may specify the function of the write buffer command 325. As an illustrative example, the write buffer command 325 may include a mode ID value 330-a from one of the exemplary modes in Table 1.

TABLE 1

Example Mode ID Values

| Mode | Description |
| --- | --- |
| 00h | Not used in UFS |
| 01h | Vendor Specific |
| 02h | Data |
| 03h-1Bh | Not used in UFS |
| 1Ch | Error History |
| 1Dh | Debug Mode |
| 1Eh-1Fh | Reserved |

The mode column of Table 1 shows specific mode ID values 330-a and the description column describes the function corresponding to each mode ID value 330-a. Although shown as having specific example modes, as well as specific mappings of the example modes to the mode ID values 330-a, different mode ID values 330-a and descriptions of the mode ID values 330-a may be used for Table 1. In some examples, the mode ID value 330-a may indicate a debug mode (e.g., such as with an exemplary mode ID value 1Dh in Table 1, or another mode ID value 330-a corresponding to a debug mode). A write buffer command 325 indicating a debug mode may trigger logging of debugging information at the memory system 310.

In some examples, the host system 305 may indicate one or more parameters for the write buffer command 325 with the buffer ID value 335-a, such that the memory system 310 may store debugging information in the debug log 320 associated with the one or more parameters. For example, the buffer ID value 335-a may specify one or more events for which the memory system 310 may log debugging information. The buffer ID value 335-*a* may indicate a command type, a count value, a duration of debug logging, or some combination of these or other event parameters configuring debug logging. The command type may correspond to a type of operation (e.g., such as a small computer system interface (SCSI) command) performed by the memory system 310 for which the memory system 310 is to track and store debug logging information. Exemplary command types may include read commands, write commands, unmap commands, synchronize cache commands, or the like. The count value may specify a quantity of commands to log. For example, the buffer ID value 335-*a* may indicate that the memory system 310 may log debugging information for the next ten commands of the indicated command type. The duration value may specify an amount of time for the memory system 310 to perform the debug logging for the indicated command type. For example, the memory system 310 may log debugging information for each command of the indicated command type executed during a time duration corresponding to the duration value, and the memory system 310 may stop the debug logging upon an expiration of the time duration. In some examples, a buffer ID value 335-*a* may indicate both a count value and a duration of debug logging, and the memory system 310 may stop debug logging in response to either condition (e.g., the count value or the duration) being met.

In some examples, the host system 305 may transmit one or more write buffer commands 325 which, alone or in combination, may indicate the command type, the count value, the duration of debug logging, or a combination thereof to the memory system 310 for debug logging. For example, the host system 305 may transmit one write buffer command 325 indicating the command type, the count value, and the duration of the debug logging. In another example, the host system 305 may transmit multiple write buffer commands 325, one indicating the command type, one indicating the count value, and one indicating the duration of the debug logging. In yet other examples, other combinations of parameters may be indicated in one or more write buffer commands 325 to configure the memory system 310 with the flexible parameters for debug logging.

The memory system 310 may receive the write buffer command 325 and may enable the logging of specific debugging information in a debug log 320 in response to the parameters indicated by the write buffer command 325. For example, the command handler 315 may be configured with a UPIU command interface with which the command handler 315 may receive and decode the write buffer command 325. In some examples, the command handler 315 may determine a type of command to log, a count value for debug logging, a duration of the debug logging, or a combination thereof indicated by the values (e.g., the mode ID value 330-*a*, the buffer ID value 335-*a*) included in the write buffer command 325. Upon receiving the write buffer command 325, the command handler 315 may trigger debug logging at the memory system 310. That is, the command handler 315 may initiate a "start save" 340 enabling one or more components of the memory system 310 to store debugging information associated with one or more parameters indicated by the buffer ID value 335-*a*. Stored debugging information may include a processing time for a command (e.g., an access command, indicated by the command type), an error identifier (e.g., if an error occurs during execution of the command), error information, a time stamp (e.g., indicating at what time an error occurred), or any combination thereof. The memory system 310 may store the debugging information in a debug log 320.

In some examples, the host system 305 may transmit a read buffer command 345 to the memory system 310. The host system 305 may indicate the read buffer command 345 using, or may associate the read buffer command 345 with, one or more UPIUs. The host system 305 may send the read buffer command 345 to the memory system 310 using a UPIU command interface. The read buffer command 345 may request retrieval of debugging information from the debug log 320. The read buffer command 345 may include a mode ID value 330-*b*, a buffer ID value 335-*b*, or both. For example, the host system 305 may include the mode ID value 330-*b* in a mode ID field and the buffer ID value 335-*b* in a buffer ID field of the read buffer command 345. In some examples, the mode ID value 330-*b* may specify the function of the read buffer command 345 using a mapping, such as the example mapping shown in Table 1. In some examples, the host system 305 may indicate one or more parameters with the buffer ID value 335-*b* such that the memory system 310 may retrieve an output 350 (e.g., debugging information) from the debug log 320 in response to the one more parameters. For example, the buffer ID value 335-*b* may specify one or more parameters configuring the debugging information to retrieve from the debug log 320. The buffer ID value 335-*b* may indicate a command type, a count value, a type of logged information, or a combination of these or other parameters. The command handler 315 may retrieve (e.g., query or otherwise read) data from the debug log 320 that satisfies the criteria specified by the buffer ID value 335-*b* in the read buffer command 345.

In some examples, the host system 305 may transmit the read buffer command 345 according to one or more criteria. Such criteria may include receiving, from the memory system 310, that a quantity of logged commands satisfies a count value, determining that a time duration has expired, or the like. For example, a read buffer command 345 may be associated with a preceding write buffer command 325. Specifically, the mode ID value 330-*b* and the buffer ID value 335-*b* of the read buffer command 345 may indicate a similar debug mode and logging parameters as the write buffer command 325. As such, the write buffer command 325 may trigger storage of debugging information in the debug log 320, and the read buffer command 345 may trigger retrieval of the stored debugging information from the debug log 320 (e.g., as output 350). Transmission of the read buffer command 345 may be triggered in response to logging the quantity of commands as indicated by the count value of the write buffer command 325, expiration of the logging duration indicated by the write buffer command 325, or both.

As per the previous example, the host system 305 may request, using the read buffer command 345, a processing time and potential error identifiers corresponding to each of the ten read commands indicated by the previous write buffer command 325. After retrieving the output 350 (e.g., including the requested processing time and potential error identifiers), the command handler 315 may transmit the output 350 to the host system 305. In some examples, the host system 305 may identify performance issues, error information, or both from the received output 350. In some other examples, the output 350 may be encoded, and the host system 305 may provide the output 350 to another device, system, or user for analysis of the output 350. Providing the debug interface may support debug logging flexibility controlled by the host system 305 as well as host system access to the information in the debug log 320, thereby improving debugging configurability and access.

Figure 4:
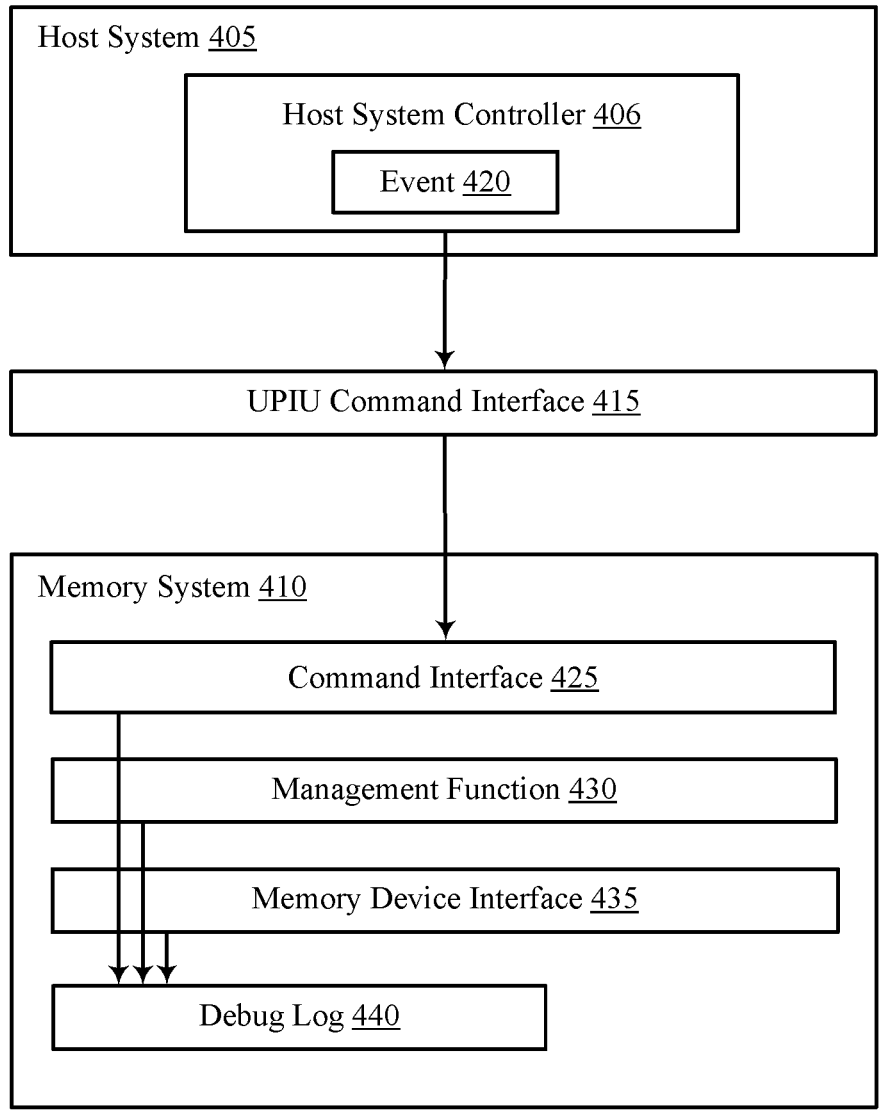

FIG. 4 illustrates an example of a system 400 that supports a debug interface between a host system 405 and a memory system 410 in accordance with examples as disclosed herein. The system 400 may be an example of, and may implement aspects of, the systems 100, 200, and 300 as described with reference to FIGS. 1 through 3. For example, the memory system 410 may be configured to receive and perform actions associated with a write buffer command 325 and a read buffer command 345, as described with reference to FIG. 3. The system 400 may support an interface for the memory system 410 to store debugging information associated with one or more layers (e.g., logical layers, interfaces) in a debug log 440. That is, the memory system 410 may store debugging information at a granularity that supports detection of specific layers or components causing performance issues, errors, or a combination thereof. For example, one or more debug logs 440 may be configured to store information that may identify the layer associated with performing actions associated with the debugging information. In some cases, the debug log 440 may be equivalently referred to as a multi-layer log.

The host system 405 may include a host system controller 406 which may be configured to perform tasks, such as command determination and transmission, debugging information acquisition, and the like. In some examples, the host system 405 may be configured to communicate with the memory system 410 using a UPIU command interface 415 as described with reference to FIG. 3.

The memory system 410 may include one or more functional layers. In some examples, the memory system 410 may include a command interface 425 (e.g., configured to interact with the host system), a management function 430 (e.g., configured to perform management functions for one or more memory devices), a memory device interface 435 (e.g., configured to write to and read from one or more memory devices), and a debug log 440, which may be respective examples of the interface 220, the memory system controller 215, the storage controller 230, and the debug log 275 as described with reference to FIG. 2. Further, the command interface 425, the management function 430, the memory device interface 435, alone or in combination, may be examples of the command handler 315 as described with reference to FIG. 3. In some cases, the command interface 425 may be referred to as an "upper" layer, the management function 430 may be referred to as a "middle" layer, and the memory device interface 435 may be referred to as a "bottom" layer, where each layer supports specific logic at the memory system 410.

In some examples, the host system controller 406 may determine to acquire debugging information, at the memory system 410, associated with one or more events 420. Accordingly, the host system controller 406 may transmit a first command (e.g., a write buffer command) to the memory system 410 indicating one or more events 420 for which to log debugging information. An event 420 may include a command to execute at the memory system 410, where the first command specifies to track and log debugging information for one or more specific, subsequent commands (e.g., according to a type of command, a quantity of commands, a duration for debug logging, or a combination thereof indicated by the write buffer command as described with reference to FIG. 3).

The memory system 410 may receive the first command and may determine to log debugging information within the debug log 440 corresponding to the one or more events 420. Debugging information may include a processing time, an error identifier, error information, a time stamp, or a combination thereof. In some examples, the memory system 410 may store debugging information associated with each functional layer of the memory system 410. For example, the memory system 410 may track the processing of an event 420 through multiple layers of the memory system 410 and store debugging information associated with each layer of the multiple layers. In some examples, the memory system 410 may store debugging information associated with each layer within the same debug log 440. For example, the memory system 410 may store the debugging information within a single debug log 440 such as a runtime debug log 275-a, a historical debug log 275-b, or another debug log 275 as described with reference to FIG. 2. In some other examples, the memory system 410 may store debugging information associated with each layer within a respective log (e.g., within a layer-specific debug log). For example, the memory system 410 may store debugging information for the command interface 425 in a debug log 440 specific to the command interface 425. In such an example, the memory system 410 may store debugging information for the management function 430 and the memory device interface 435 in respective debug logs 440 specific to each layer. In yet other examples, the memory system 410 may store debugging information associated with a first group of layers within a first debug log 440 and debugging information associated with a second group of layers within a second debug log 440. For example, a first group of layers may include the command interface 425 and a second group of layers may include the management function 430 and the memory device interface 435. Accordingly, the memory system 410 may store debugging information with associations to specific layers, interfaces, functions, components, logic, or a combination thereof in one or more debug logs 440, such that the debugging information provides granular data indicating which specific layers, interfaces, functions, components, logic, or combination thereof are causing performance issues, errors, or both.

As an example, the command interface 425 may receive the first command and may log debugging information for the next ten write commands executed by the memory system 410. The memory system 410 may store a processing time (e.g., a start timestamp, an end timestamp) associated with processing the next ten write commands (e.g., corresponding to the events 420) at the command interface 425. Additionally, if the command interface 425 experiences an error while processing the next ten write commands, the memory system 410 may store error information, an error identifier, an error timestamp, or a combination thereof associated with the error within the debug log 440. The memory system 410 may continue to track and store debugging information for the ten write commands (e.g., the events 420) through the management function 430, the memory device interface 435, or any combination of these or other layers. The memory system 410 may store, in the debug log 440, processing times, error information, or any combination of these or other debugging information (e.g., specified by the write buffer command) for each of the layers throughout execution of the write commands.

In some examples, the memory system 410 may store relative time stamps, for example, according to a local time tracked by the memory system 410. In some other examples, the memory system 410 may receive an indication of a system timing (e.g., from the host system 405), allowing the memory system 410 to enable a real-time clock (RTC) at the memory system 410 and store the debugging information using host time stamps (e.g., absolute time values) associated with the RTC. The memory system 410 may be configured to store debugging information for any functional layer in the debug log 440. In some examples, each functional layer may include information identifying the layer (e.g., a layer ID) with the stored debugging information, such that retrieval of the debugging information may allow the host system controller 406 to determine which layer may be experiencing performance issues, errors, or both.

The host system controller 406 may transmit a second command (e.g., a read buffer command) for retrieving debugging information. The second command may be associated with the first command, such that the second command may cause the memory system 410 to retrieve and transmit, from the debug log 440, debugging information associated with the one or more events 420 indicated in the first command. In response to receiving the debugging information, the host system controller 406 may determine if performance issues and errors have occurred and the layer in which a specific performance issue or error occurred.

Figure 5:
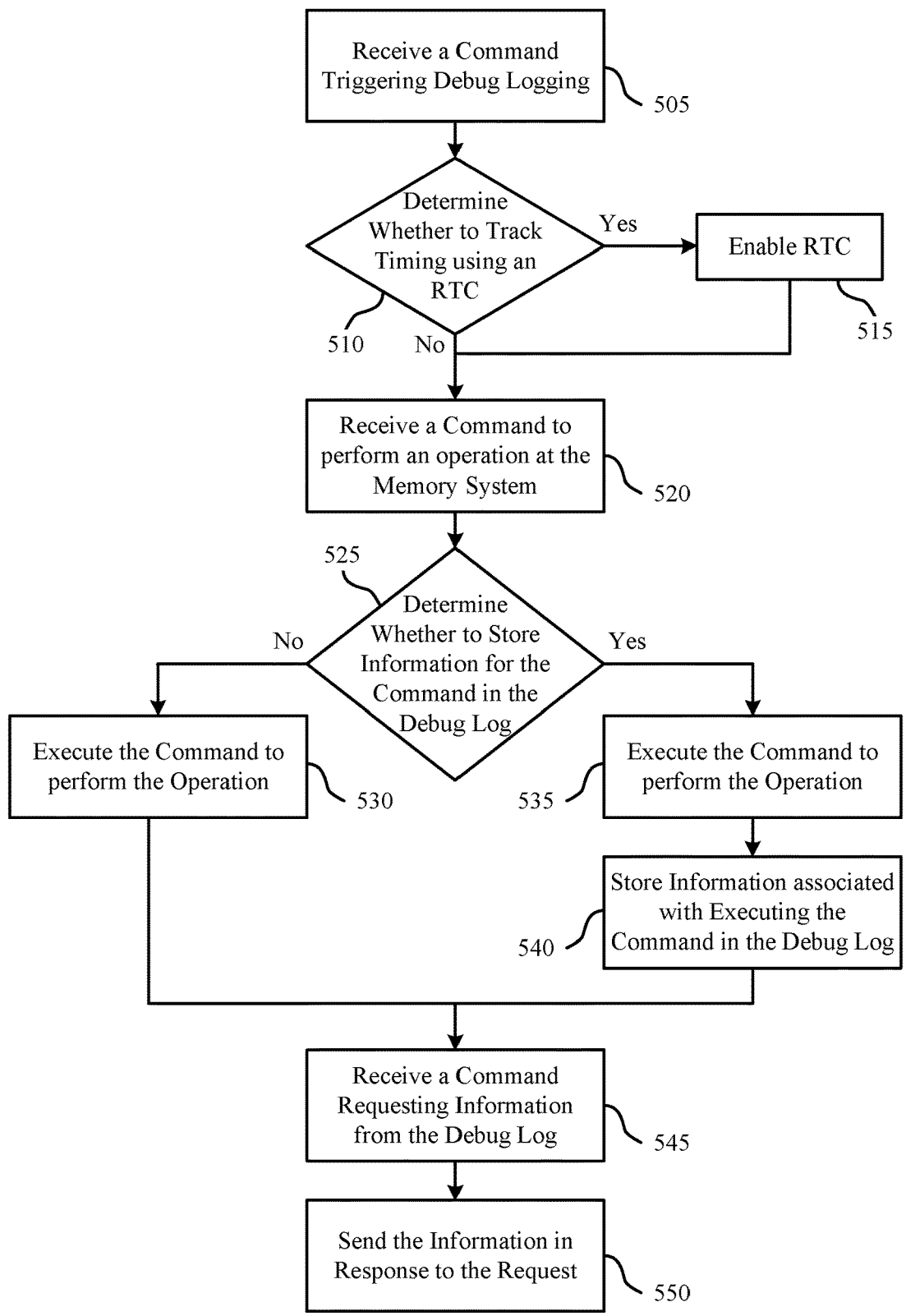
FIG. 5 illustrates an example of a process flow that supports a debug interface between a host system and a memory system in accordance with examples as disclosed herein.

FIG. 5 illustrates an example of a process flow 500 that supports a debug interface between a host system and a memory system in accordance with examples as disclosed herein. The operations of the process flow 500 may be implemented by a memory system or its components as described herein. For example, the operations of the process flow 500 may be performed by a system as described with reference to FIGS. 1 through 4. A memory system may perform operations associated with the process flow 500 to support a debug mode, in which one or more commands from a host system may configure debugging logging and operations. Alternative examples of the following may be implemented, where some steps are performed in a different order or not at all. Additionally, some steps may include additional features not mentioned below.

Aspects of the process flow 500 may be implemented by a controller, among other components (e.g., a memory system controller of a memory system, a host system controller of a host system). Additionally or alternatively, aspects of the process flow 500 may be implemented as instructions stored in memory (e.g., firmware stored in a memory coupled with the memory system). For example, the instructions, if executed by a controller, may cause the controller to perform the operations of the process flow 500.

At 505, a command for debug logging may be received. For example, the host system may send, and the memory system may receive, a command triggering debug logging at the memory system. Triggering debug logging may involve activating a mode at the memory system to store specific information associated with executing specific commands in a debug log. For example, the memory system may store some debugging information during normal operations. In such an example, triggering debug logging may involve the memory system storing additional or alternative debugging information (e.g., indicated by the command) in a debug log. Some debug logging at the memory system may be transparent to the host system. Additionally or alternatively, the memory system may indicate to the host system the types of information stored in a debug log for one or more operations (e.g., execution of specific commands) at the memory system.

The command triggering debug logging may be an example of a write buffer command including an indication of a debug mode (e.g., a mode ID value) and a set of parameters (e.g., indicated by a buffer ID value) as described with reference to FIG. 3. The indication of the debug mode may trigger the debug logging and the information to store in a debug log may be configured by the set of parameters. In some examples, the debug log may be stored in a cache, at a memory device, or both, as described with reference to FIG. 2.

At 510, a decision of whether to track timing using an RTC may be determined. For example, if the memory system receives, from the host system, an indication of system timing for the host system, the memory system may enable an RTC at 515 using the host system timing. For example, the memory system may determine to track timing using the RTC and may enable the RTC in response to receiving the indication of system timing from the host system. Enabling the RTC is described in more detail with reference to FIG. 4. Enabling RTC at the memory system may align timing for a debug log at the memory system with timing for one or more logs maintained at the host system. Additionally or alternatively, the memory system may be configured to default to using the RTC for tracking timing. In some other examples, the memory system may determine not to track timing using the RTC. As such, the memory system may determine to track timing using a local time (e.g., local time stamps maintained at the memory system).

At 520, a command to perform an operation may be received. For example, the host system may transmit and the memory system may receive a command to perform an access operation (e.g., a read operation, a write operation, or another access operation as described herein) at the memory system.

At 525, a decision of whether to store information for the command received at 520 in a debug log may be determined. That is, the memory system may determine whether to log an event in the debug log, for example, according to the set of parameters in the command received at 505. In some examples, the memory system may determine whether to log the event, such as an event associated with the command at 520.

In some cases, the memory system may determine not to store information in the debug log. For example, at 530, the command may be executed. If the write buffer command does not indicate to store debugging information for the command (e.g., due to the command type, a quantity of commands previously logged, an expiration of a debug logging duration), the memory system may execute the command at 520 to perform the operation at the memory system without storing debugging information associated with performing the operation in the debug log. In some cases, the memory system may trace the command execution, but may refrain from saving the trace log in response to determining that the write buffer command does not indicate to store debugging information for the command.

In some other cases, the memory system may determine to store information in the debug log. For example, the memory system may determine a type of command for the debug logging, a count value for the debug logging, a time duration for the debug logging, or a combination thereof according to the write buffer command, as described in more detail with reference to FIGS. 3 and 4. The memory system may identify that the command received at 520 corresponds to a command for which to log debugging information according to the write buffer command received at 505.

At 535, the command may be executed. For example, after determining to store, in the debug log, the information for the command received at 520, the memory system may execute the command to perform the operation specified by the command.

At 540, information may be stored in the debug log. For example, during execution of the command received at 520, the memory system may store information associated with executing the command in the debug log. The information may include a processing time (e.g., for performing the operation) at one or more components (e.g., layers, logic, hardware) of the memory system, an error identifier associated with executing the command, error information associated with the error identifier, a timestamp associated with the error identifier, or a combination thereof. Storing information in the debug log corresponding to one or more components, or functional layers, is described in more detail with reference to FIG. 4. The triggered debug mode may support tracing any event (e.g., in firmware of the memory system) through one or more layers or levels of the memory system. The host system may flexibly determine and indicate the events, layers, or both to trace for debugging operations, and the information stored at 540 may be determined in response to the indications from the host system. If the memory system is updated to support additional events, the debug interface may correspondingly be updated to support debug logging for the additional events.

At 545, a command requesting information may be received. For example, the host system may send, and the memory system may receive, a command requesting a portion of information from the debug log. The command may be an example of a read buffer command including an indication of a debug mode (e.g., a mode ID value) and a set of parameters (e.g., as indicated by a buffer ID value). In some examples, the portion of information may be associated with the set of parameters. Operations corresponding to the command are described in more detail with reference to FIG. 3.

At 550, the information may be sent. For example, the memory system may send, and the host system may receive, the portion of the information from the debug log in response to the command received at 545. The information may allow the host system (or another system, device, or user) to identify causes of performance issues, errors, or both at the memory system using the logged debugging information. For example, the host system may support on-site debugging (e.g., for performance issues) using the logged and retrieved debugging information. Additionally or alternatively, supporting the debug interface may reduce latency (e.g., a build time, a gating time, a rework phone time) and processing resources associated with debugging a memory system. The host system may send the retrieved debugging information to other systems, devices, or users to analyze the information and efficiently determine which layer, function, or both is causing a performance issue, an error, or some combination thereof.

Figure 6:
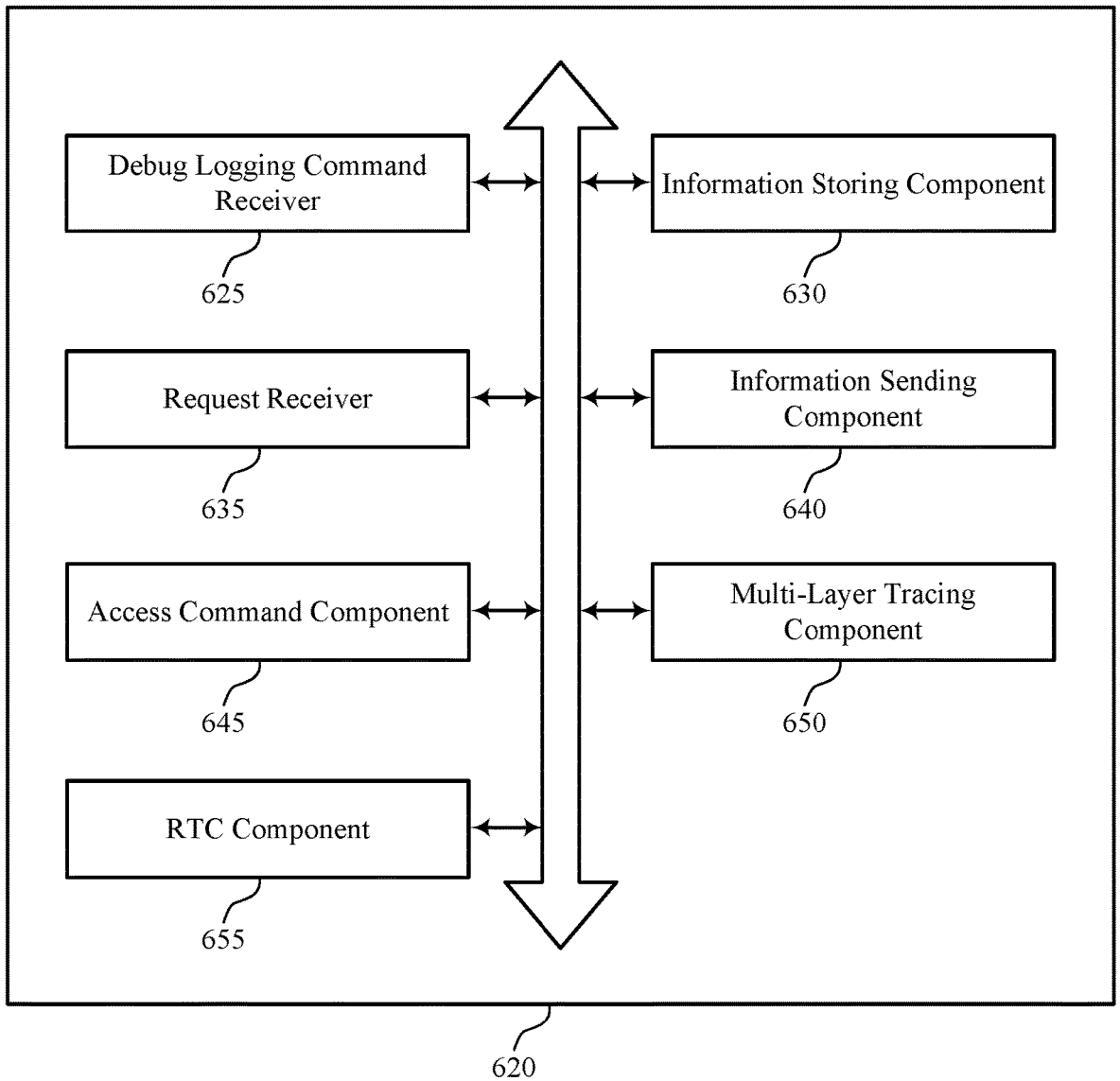
FIG. 6 shows a block diagram of a memory system that supports a debug interface between a host system and a memory system in accordance with examples as disclosed herein.

FIG. 6 shows a block diagram 600 of a memory system 620 that supports a debug interface between a host system and a memory system in accordance with examples as disclosed herein. The memory system 620 may be an example of aspects of a memory system as described with reference to FIGS. 1 through 5. The memory system 620, or various components thereof, may be an example of means for performing various aspects of a debug interface between a host system and a memory system as described herein. For example, the memory system 620 may include a debug logging command receiver 625, an information storing component 630, a request receiver 635, an information sending component 640, an access command component 645, a multi-layer tracing component 650, an RTC component 655, or any combination thereof. Each of these components may communicate, directly or indirectly, with one another (e.g., via one or more buses).

The debug logging command receiver 625 may be configured as or otherwise support a means for receiving, from a host system, a first command triggering debug logging at the memory system 620. The information storing component 630 may be configured as or otherwise support a means for storing information in a debug log in response to the first command. The request receiver 635 may be configured as or otherwise support a means for receiving, from the host system, a second command requesting at least a portion of the information stored in the debug log. The information sending component 640 may be configured as or otherwise support a means for sending, to the host system, the portion of the information in response to the second command.

In some examples, the information storing component 630 may be configured as or otherwise support a means for determining, based on (e.g., in response to) the first command, a type of command to log for the debug logging, a count value for the debug logging, a duration for the debug logging, or any combination thereof, where the information may be stored in the debug log based on (e.g., according to) the type of command, the count value, the duration, or any combination thereof.

In some examples, the access command component 645 may be configured as or otherwise support a means for executing a third command at the memory system, where the third command is subject to the debug logging triggered by the first command, and where the information storing component 630 may store, in the debug log, the information including a processing time for the third command at one or more components of the memory system, an error identifier associated with executing the third command, error information associated with the error identifier, a timestamp associated with the error identifier, or any combination thereof.

In some examples, to support receiving the first command, the debug logging command receiver 625 may be configured as or otherwise support a means for receiving a write buffer command including an indication of a debug mode and a set of parameters, where the indication of the debug mode is configured to trigger the debug logging and the information is stored in the debug log based on (e.g., using, as a filter) the set of parameters. In some examples, the write buffer command includes a mode field with a mode value indicating the debug mode, and the write buffer command includes a buffer ID field with a buffer ID value indicating the set of parameters.

In some examples, to support receiving the second command, the debug logging command receiver 625 may be configured as or otherwise support a means for receiving a read buffer command including an indication of a debug mode and a set of parameters, where the indication of the debug mode indicates the debug log and the read buffer command requests the portion of the information stored in the debug log based on (e.g., using, as a filter) the set of parameters. In some examples, the read buffer command includes a mode field with a mode value indicating the debug mode, and the read buffer command includes a buffer ID field with a buffer ID value indicating the set of parameters.

In some examples, to support storing the information in the debug log, the multi-layer tracing component 650 may be configured as or otherwise support a means for storing first information associated with a first layer of the memory system configured to interact with the host system, second information associated with a second layer of the memory system configured to perform management functions for the memory device, third information associated with a third layer of the memory system configured to interact with the memory device, or any combination thereof.

In some examples, the RTC component 655 may be configured as or otherwise support a means for receiving, from the host system, an indication of system timing for the host system and enabling an RTC at the memory system based on (e.g., in response to) the system timing for the host system, where the information is stored in the debug log using host timestamps based on (e.g., using timing from) the enabled RTC.

In some examples, the information storing component 630 may be configured as or otherwise support a means for storing the debug log at a cache of the memory system, at the memory device, or both. In some examples, the cache includes a runtime debug log, and the memory device includes a historical debug log.

Figure 7:
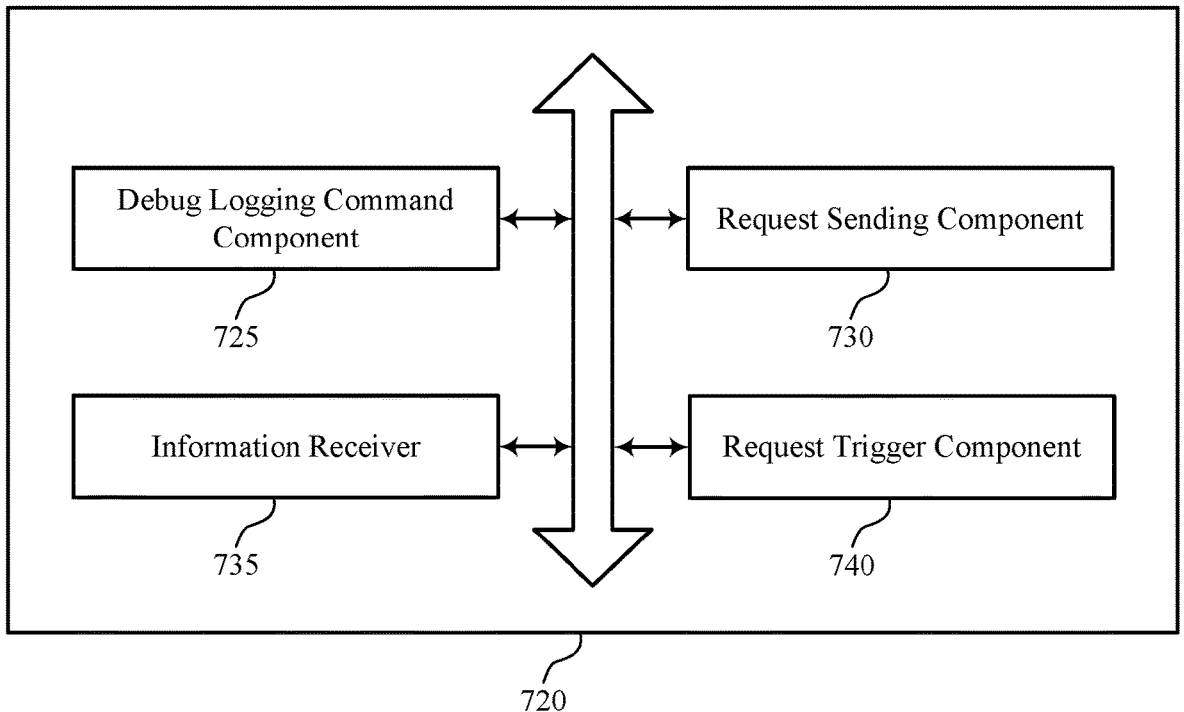
FIG. 7 shows a block diagram of a host system that supports a debug interface between a host system and a memory system in accordance with examples as disclosed herein.

FIG. 7 shows a block diagram 700 of a host system 720 that supports a debug interface between a host system and a memory system in accordance with examples as disclosed herein. The host system 720 may be an example of aspects of a host system as described with reference to FIGS. 1 through 5. The host system 720, or various components thereof, may be an example of means for performing various aspects of a debug interface between a host system and a memory system as described herein. For example, the host system 720 may include a debug logging command component 725, a request sending component 730, an information receiver 735, or any combination thereof. Each of these components may communicate, directly or indirectly, with one another (e.g., via one or more buses).

The debug logging command component 725 may be configured as or otherwise support a means for sending, to a memory system, a first command triggering debug logging at the memory system. The request sending component 730 may be configured as or otherwise support a means for sending, to the memory system, a second command requesting at least a portion of information from a debug log, the portion of the information associated with debug logging in response to the first command. The information receiver 735 may be configured as or otherwise support a means for receiving, from the memory system and in response to the second command, the portion of the information from the debug log.

In some examples, the debug logging command component 725 may be configured as or otherwise support a means for configuring the first command to indicate a type of command to log for the debug logging, a count value for the debug logging, a duration for the debug logging, or any combination thereof, where the information stored in the debug log in response to the first command is based on (e.g., selected according to) the type of command, the count value, the duration, or any combination thereof.

In some examples, the first command may indicate a count value for the debug logging, and the request trigger component 740 may be configured as or otherwise support a means for receiving, from the memory system, an indication that the debug log has logged a quantity of commands satisfying the count value, where the second command may be sent based on (e.g., in response to) the indication. In some other examples, the first command may indicate a time duration for the debug logging, and the request trigger component 740 may be configured as or otherwise support a means for determining that the time duration has expired, where the second command may be sent based on (e.g., in response to) determining that the time duration has expired.

In some examples, the portion of the information from the debug log includes a processing time for a command at one or more components of the memory system, an error identifier associated with executing a third command at the memory system, error information associated with the error identifier, a timestamp associated with the error identifier, or any combination thereof.

In some examples, to support sending the first command, the debug logging command component 725 may be configured as or otherwise support a means for sending a write buffer command including an indication of a debug mode and a set of parameters, where the indication of the debug mode is configured to trigger the debug logging and the portion of the information from the debug log is based on (e.g., filtered using) the set of parameters.

In some examples, to support sending the second command, the request sending component 730 may be configured as or otherwise support a means for sending a read buffer command including an indication of a debug mode and a set of parameters, where the indication of the debug mode indicates the debug log and the read buffer command requests the portion of the information from the debug log based on (e.g., using, as a filter) the set of parameters.

Figure 8:
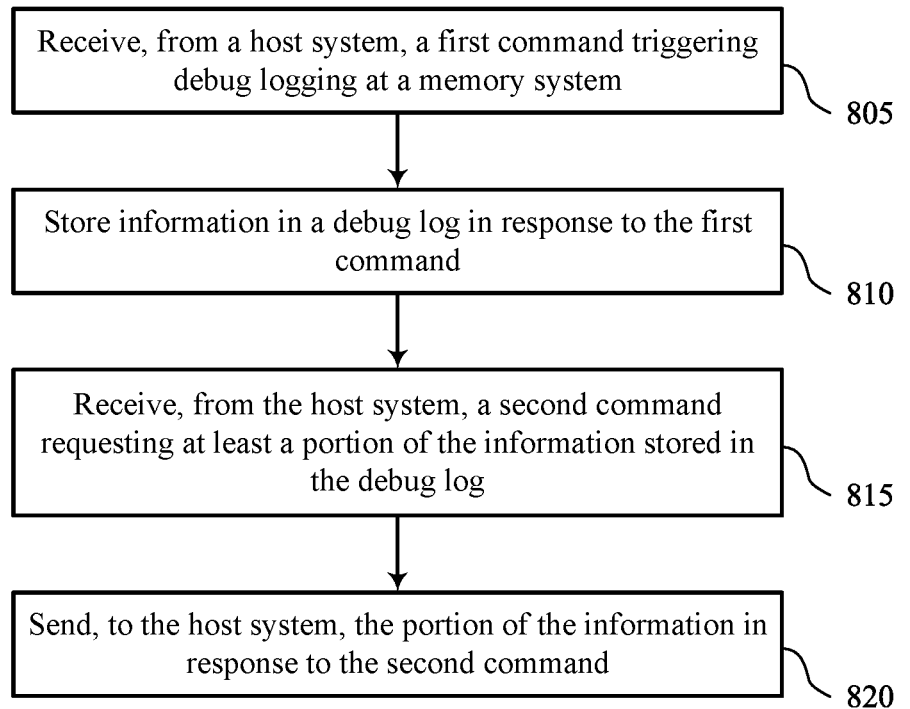
FIGS. 8 and 9 show flowcharts illustrating a method or methods that support a debug interface between a host system and a memory system in accordance with examples as disclosed herein.

FIG. 8 shows a flowchart illustrating a method 800 that supports a debug interface between a host system and a memory system in accordance with examples as disclosed herein. The operations of method 800 may be implemented by a memory system or its components as described herein. For example, the operations of method 800 may be performed by a memory system as described with reference to FIGS. 1 through 6. In some examples, a memory system may execute a set of instructions to control the functional elements of the system to perform the described functions. Additionally or alternatively, the memory system may perform aspects of the described functions using special-purpose hardware.

At 805, the method may include receiving, from a host system, a first command triggering debug logging at the memory system. The operations of 805 may be performed in accordance with examples as disclosed herein. In some examples, aspects of the operations of 805 may be performed by a debug logging command receiver 625 as described with reference to FIG. 6.

At 810, the method may include storing information in a debug log in response to the first command. The operations of 810 may be performed in accordance with examples as disclosed herein. In some examples, aspects of the operations of 810 may be performed by an information storing component 630 as described with reference to FIG. 6.

At 815, the method may include receiving, from the host system, a second command requesting at least a portion of the information stored in the debug log. The operations of 815 may be performed in accordance with examples as disclosed herein. In some examples, aspects of the operations of 815 may be performed by a request receiver 635 as described with reference to FIG. 6.

At 820, the method may include sending, to the host system, the portion of the information in response to the second command. The operations of 820 may be performed in accordance with examples as disclosed herein. In some examples, aspects of the operations of 820 may be performed by an information sending component 640 as described with reference to FIG. 6.

In some examples, an apparatus as described herein may perform a method or methods, such as the method 800. The apparatus may include features, circuitry, logic, means, or instructions (e.g., a non-transitory computer-readable medium storing instructions executable by a processor) for receiving, from a host system, a first command triggering debug logging at a memory system, storing information in a debug log in response to the first command, receiving, from the host system, a second command requesting at least a portion of the information stored in the debug log, and sending, to the host system, the portion of the information in response to the second command.

Some examples of the method 800 and the apparatus described herein may further include operations, features, circuitry, logic, means, or instructions for determining, based on (e.g., in response to) the first command, a type of command to log for the debug logging, a count value for the debug logging, a duration for the debug logging, or any combination thereof, where the information is stored in the debug log based on (e.g., according to) the type of command, the count value, the duration, or any combination thereof.

Some examples of the method 800 and the apparatus described herein may further include operations, features, circuitry, logic, means, or instructions for executing a third command at the memory system, where the third command is subject to the debug logging triggered by the first command, and where the information stored in the debug log includes a processing time for the third command at one or more components of the memory system, an error identifier associated with executing the third command, error information associated with the error identifier, a timestamp associated with the error identifier, or any combination thereof.

In some examples of the method 800 and the apparatus described herein, operations, features, circuitry, logic, means, or instructions for receiving the first command may include operations, features, circuitry, logic, means, or instructions for receiving a write buffer command including an indication of a debug mode and a set of parameters, where the indication of the debug mode is configured to trigger the debug logging and the information is stored in the debug log based on (e.g., in response to) the set of parameters. In some examples, the write buffer command includes a mode field with a mode value indicating the debug mode, and the write buffer command includes a buffer ID field with a buffer ID value indicating the set of parameters.

In some examples of the method 800 and the apparatus described herein, operations, features, circuitry, logic, means, or instructions for receiving the second command may include operations, features, circuitry, logic, means, or instructions for receiving a read buffer command including an indication of a debug mode and a set of parameters, where the indication of the debug mode indicates the debug log and the read buffer command requests the portion of the information stored in the debug log based on (e.g., in response to) the set of parameters. In some examples, the read buffer command includes a mode field with a mode value indicating the debug mode, and the read buffer command includes a buffer ID field with a buffer ID value indicating the set of parameters.

In some examples of the method 800 and the apparatus described herein, operations, features, circuitry, logic, means, or instructions for storing the information in the debug log may include operations, features, circuitry, logic, means, or instructions for storing first information associated with a first layer of the memory system configured to interact with the host system, second information associated with a second layer of the memory system configured to perform management functions for the memory device, third information associated with a third layer of the memory system configured to interact with the memory device, or any combination thereof.

Some examples of the method 800 and the apparatus described herein may further include operations, features, circuitry, logic, means, or instructions for receiving, from the host system, an indication of system timing for the host system and enabling an RTC at the memory system based on (e.g., using) the system timing for the host system, where the information is stored in the debug log using host timestamps based on (e.g., in response to) the enabled RTC.

Some examples of the method 800 and the apparatus described herein may further include operations, features, circuitry, logic, means, or instructions for storing the debug log at a cache of the memory system, at the memory device, or both. In some examples, the cache includes a runtime debug log, and the memory device includes a historical debug log.

Figure 9:
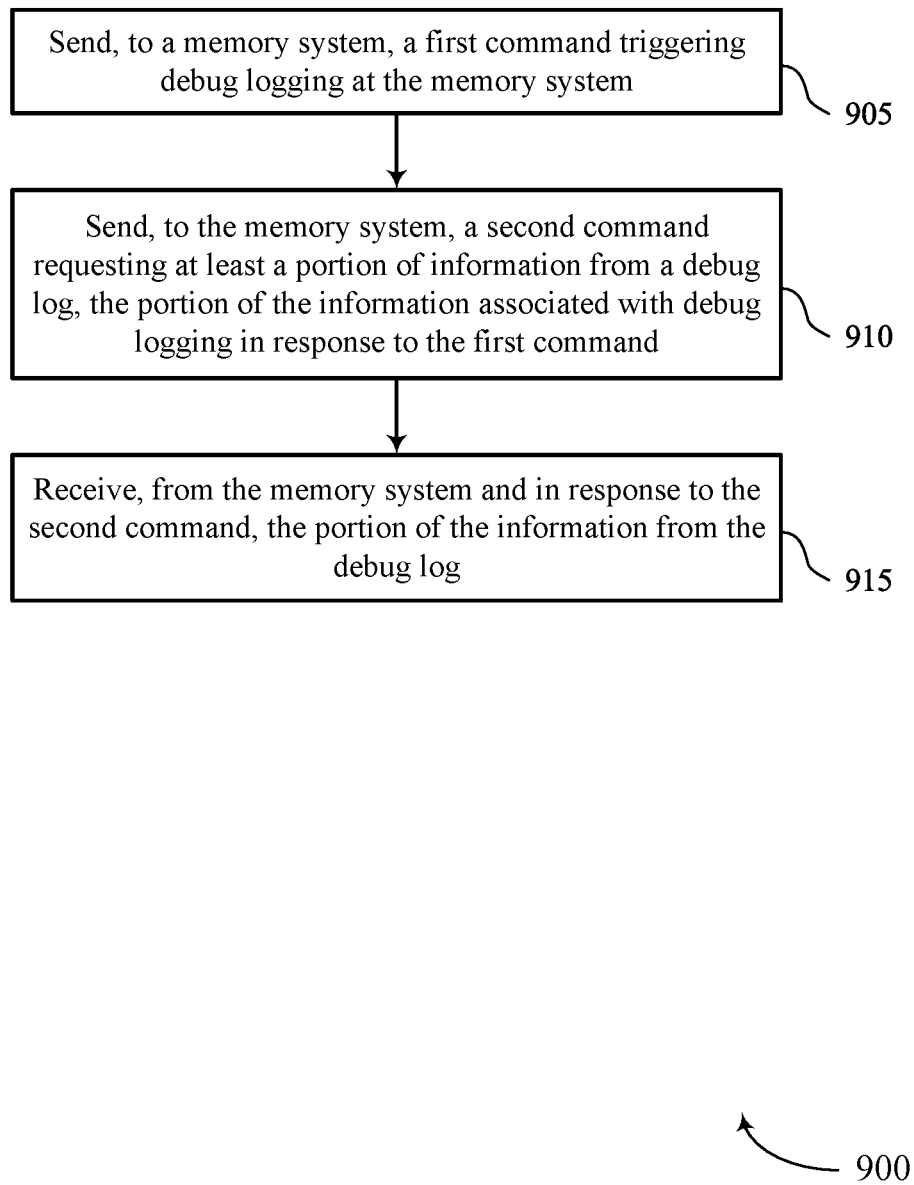

FIG. 9 shows a flowchart illustrating a method 900 that supports a debug interface between a host system and a memory system in accordance with examples as disclosed herein. The operations of method 900 may be implemented by a host system or its components as described herein. For example, the operations of method 900 may be performed by a host system as described with reference to FIGS. 1 through 5 and 7. In some examples, a host system may execute a set of instructions to control the functional elements of the system to perform the described functions. Additionally or alternatively, the host system may perform aspects of the described functions using special-purpose hardware.

At 905, the method may include sending, to a memory system, a first command triggering debug logging at the memory system. The operations of 905 may be performed in accordance with examples as disclosed herein. In some examples, aspects of the operations of 905 may be performed by a debug logging command component 725 as described with reference to FIG. 7.

At 910, the method may include sending, to the memory system, a second command requesting at least a portion of information from a debug log, the portion of the information associated with debug logging in response to the first command. The operations of 910 may be performed in accordance with examples as disclosed herein. In some examples, aspects of the operations of 910 may be performed by a request sending component 730 as described with reference to FIG. 7.

At 915, the method may include receiving, from the memory system and in response to the second command, the portion of the information from the debug log. The operations of 915 may be performed in accordance with examples as disclosed herein. In some examples, aspects of the operations of 915 may be performed by an information receiver 735 as described with reference to FIG. 7.

In some examples, an apparatus as described herein may perform a method or methods, such as the method 900. The apparatus may include, features, circuitry, logic, means, or instructions (e.g., a non-transitory computer-readable medium storing instructions executable by a processor) for sending, to a memory system, a first command triggering debug logging at the memory system, sending, to the memory system, a second command requesting at least a portion of information from a debug log, the portion of the information associated with debug logging in response to the first command, and receiving, from the memory system and in response to the second command, the portion of the information from the debug log.

Some examples of the method 900 and the apparatus described herein may further include operations, features, circuitry, logic, means, or instructions for configuring the first command to indicate a type of command to log for the debug logging, a count value for the debug logging, a duration for the debug logging, or any combination thereof, where the information stored in the debug log in response to the first command is based on (e.g., in response to) the type of command, the count value, the duration, or any combination thereof.

In some examples, the first command indicates a count value for the debug logging. Some examples of the method 900 and the apparatus described herein may further include operations, features, circuitry, logic, means, or instructions for receiving, from the memory system, an indication that the debug log has logged a quantity of commands satisfying the count value, where the second command is sent based on (e.g., in response to) the indication.

In some examples, the first command indicates a time duration for the debug logging. Some examples of the method 900 and the apparatus described herein may further include operations, features, circuitry, logic, means, or instructions for determining that the time duration has expired, where the second command is sent based on (e.g., in response to) determining that the time duration has expired.

In some examples, the portion of the information from the debug log includes a processing time for a command at one or more components of the memory system, an error identifier associated with executing a third command at the memory system, error information associated with the error identifier, a timestamp associated with the error identifier, or any combination thereof.

In some examples of the method 900 and the apparatus described herein, operations, features, circuitry, logic, means, or instructions for sending the first command may include operations, features, circuitry, logic, means, or instructions for sending a write buffer command including an indication of a debug mode and a set of parameters, where the indication of the debug mode is configured to trigger the debug logging and the portion of the information from the debug log is based on (e.g., filtered using) the set of parameters.

In some examples of the method 900 and the apparatus described herein, operations, features, circuitry, logic, means, or instructions for sending the second command may include operations, features, circuitry, logic, means, or instructions for sending a read buffer command including an indication of a debug mode and a set of parameters, where the indication of the debug mode indicates the debug log and the read buffer command requests the portion of the information from the debug log based on (e.g., in response to) the set of parameters.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit according to the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or technologies such as infrared, radio, and microwave, then the coaxial cable, fiber optic cable, twisted pair, DSL, or technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
   one or more memory devices; and processing circuitry coupled with the one or more memory devices and configured to cause the memory system to:
receive, from a host system, a write buffer command comprising a mode field with a mode value indicating a debug mode, the write buffer command indicating a count value corresponding to a quantity of commands for debug logging, wherein receiving the mode field triggers the debug logging at the memory system;
store information in a debug log in response to the write buffer command, wherein the information corresponds to a set of commands that is in accordance with the count value;
transmit an indication that the debug log has logged the quantity of commands satisfying the count value;
receive, from the host system and in response to the indication, a second command requesting at least a portion of the information stored in the debug log; and
send, to the host system, the portion of the information in response to the second command.

2. The memory system of claim 1, wherein the processing circuitry is further configured to cause the memory system to:
determine, in accordance with the mode value of the write buffer command, a type of command to log for the debug logging, the count value for the debug logging, a duration for the debug logging, or any combination thereof, wherein the processing circuitry is configured to cause the memory system to store the information in the debug log in accordance with the type of command, the count value, the duration, or any combination thereof.

3. The memory system of claim 1, wherein the processing circuitry is further configured to cause the memory system to:
execute a third command at the memory system, wherein the third command is subject to the debug logging triggered by the write buffer command, and wherein the processing circuitry is configured to cause the memory system to store, in the debug log, the information comprising a processing time for the third command at one or more components of the memory system, an error identifier associated with executing the third command, error information associated with the error identifier, a timestamp associated with the error identifier, or any combination thereof.

4. The memory system of claim 1, wherein the write buffer command comprises an indication of a set of parameters, and wherein the processing circuitry is configured to cause the memory system to store the information in the debug log in accordance with the set of parameters.

5. A memory system, comprising:
one or more memory devices; and
processing circuitry coupled with the one or more memory devices and configured to cause the memory system to:
receive, from a host system, a write buffer command comprising a mode field with a mode value indicating a debug mode and a buffer identifier field with a buffer identifier value indicating a set of parameters, the set of parameters comprising a count value corresponding to a quantity of commands for debug logging, wherein the mode field triggers the debug logging at the memory system;
store information in a debug log in response to the write buffer command in accordance with the set of parameters, wherein the information corresponds to a set of commands that is in accordance with the count value;
transmit an indication that the debug log has logged the quantity of commands satisfying the count value;
receive, from the host system and in response to the indication, a second command requesting at least a portion of the information stored in the debug log; and
send, to the host system, the portion of the information in response to the second command.

6. The memory system of claim 1, wherein, to receive the second command, the processing circuitry is configured to cause the memory system to:
receive a read buffer command comprising an indication of the debug mode and a set of parameters, wherein the indication of the debug mode indicates the debug log and the read buffer command requests the portion of the information stored in the debug log in accordance with the set of parameters.

7. A memory system, comprising:
one or more memory devices; and
processing circuitry coupled with the one or more memory devices and configured to cause the memory system to:
receive, from a host system, a first command triggering debug logging at the memory system, the first command indicating a count value corresponding to a quantity of commands for the debug logging;
store information in a debug log in response to the first command, wherein the information corresponds to a set of commands that is in accordance with the count value;
transmit an indication that the debug log has logged the quantity of commands satisfying the count value;
receive, from the host system and in response to the indication, a read buffer command requesting at least a portion of the information stored in the debug log, the read buffer command comprising a mode field with a mode value indicating a debug mode and a buffer identifier field with a buffer identifier value indicating a set of parameters, wherein the mode field that indicates the debug mode further indicates the debug log and the read buffer command requests the portion of the information stored in the debug mode in accordance with the set of parameters; and
send, to the host system, the portion of the information in response to the read buffer command.

8. The memory system of claim 1, wherein, to store the information in the debug log, the processing circuitry is configured to cause the memory system to:
store first information associated with a first layer of the memory system configured to interact with the host system, second information associated with a second layer of the memory system configured to perform management functions for the one or more memory devices, third information associated with a third layer of the memory system configured to interact with the one or more memory devices, or any combination thereof.

9. The memory system of claim 1, wherein the processing circuitry is further configured to cause the memory system to:
receive, from the host system, an indication of system timing for the host system; and enable a real-time clock at the memory system in accordance with the system timing for the host system, wherein the processing circuitry is configured to cause the memory system to store the information in the debug log using host timestamps in accordance with the enabled real-time clock.

10. The memory system of claim 1, wherein the processing circuitry is further configured to cause the memory system to:
store the debug log at a cache of the memory system, at the one or more memory devices, or both.

11. The memory system of claim 8, wherein:
the cache comprises a runtime debug log; and
the one or more memory devices comprises a historical debug log.

12. A host system, comprising:
processing circuitry configured to couple with a memory system, wherein the processing circuitry is configured to cause the host system to:
send, to the memory system, a write buffer command comprising a mode field with a mode value indicating a debug mode and triggers debug logging at the memory system, the write buffer command indicating a count value corresponding to a quantity of commands for the debug logging;
receive, from the memory system, an indication that a debug log of the memory system has logged the quantity of commands satisfying the count value;
send, to the memory system and in response to the indication, a second command requesting at least a portion of information from a debug log, the portion of the information associated with the debug logging in response to the write buffer command, wherein the information corresponds to a set of commands that is in accordance with the count value; and
receive, from the memory system and in response to the second command, the portion of the information from the debug log.

13. The host system of claim 12, wherein the processing circuitry is further configured to cause the host system to:
configure the write buffer command such that the mode value indicates a type of command to log for the debug logging, the count value for the debug logging, a duration for the debug logging, or any combination thereof, wherein the information stored in the debug log in response to the write buffer command is in accordance with the type of command, the count value, the duration, or any combination thereof.

14. The host system of claim 12, wherein the write buffer command indicates a duration for the debug logging, and the processing circuitry is further configured to cause the host system to:
determine that the duration has expired, wherein the processing circuitry is configured to cause the host system to send the second command in response to determining that the duration has expired.

15. The host system of claim 12, wherein the portion of the information from the debug log comprises a processing time for a command at one or more components of the memory system, an error identifier associated with executing a third command at the memory system, error information associated with the error identifier, a timestamp associated with the error identifier, or any combination thereof.

16. The host system of claim 12, wherein, to send the write buffer command, the processing circuitry is configured to cause the host system to:
send the write buffer command comprising an indication of the debug mode and a set of parameters, wherein the indication of the debug mode is configured to trigger the debug logging and the portion of the information from the debug log is received in accordance with the set of parameters.

17. The host system of claim 12, wherein, to send the second command, the processing circuitry is configured to cause the host system to:
send a read buffer command comprising an indication of the debug mode and a set of parameters, wherein the indication of the debug mode indicates the debug log and the read buffer command requests the portion of the information from the debug log in accordance with the set of parameters.

18. A non-transitory computer-readable medium storing code comprising instructions which, when executed by a processor of an electronic device, cause the electronic device to:
receive, from a host system, a write buffer command comprising a mode field with a mode value indicating a debug mode, the write buffer command indicating a count value corresponding to a quantity of commands for debug logging, wherein receiving the mode field triggers the debug logging at memory system;
store information in a debug log in response to the write buffer command, wherein the information corresponds to a set of commands that is in accordance with the count value;
transmit an indication that the debug log has logged the quantity of commands satisfying the count value;
receive, from the host system and in response to the indication, a second command requesting at least a portion of the information stored in the debug log; and
send, to the host system, the portion of the information in response to the second command.

19. The non-transitory computer-readable medium of claim 18, wherein the instructions, when executed by the processor of the electronic device, further cause the electronic device to:
determine, in accordance with the write buffer command, a type of command to log for the debug logging, the count value for the debug logging, a duration for the debug logging, or any combination thereof, wherein the information is stored in the debug log in accordance with the type of command, the count value, the duration, or any combination thereof.

* * * * *